June 12, 1956  S. APOSTOLESCU  2,749,994
LIFT ROTOR CONSTRUCTION FOR TANDEM ROTOR HELICOPTERS
Filed April 3, 1951  3 Sheets-Sheet 1
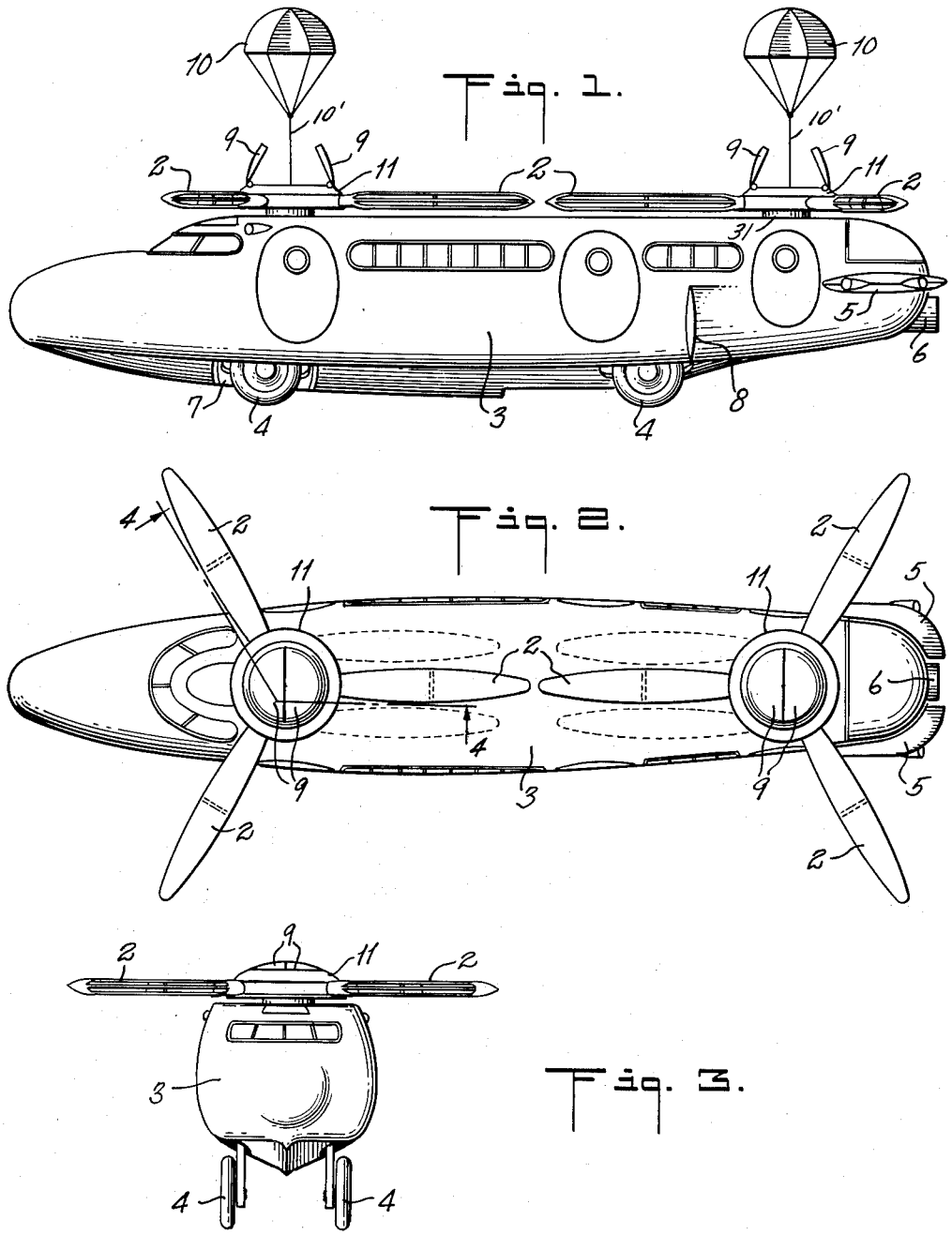
INVENTOR.
Stefan Apostolescu June 12, 1956 S. APOSTOLESCU 2,749,994
LIFT ROTOR CONSTRUCTION FOR TANDEM ROTOR HELICOPTERS
Filed April 3, 1951 3 Sheets-Sheet 2

INVENTOR.
Stefan Apostolescu

June 12, 1956 — S. APOSTOLESCU — 2,749,994
LIFT ROTOR CONSTRUCTION FOR TANDEM ROTOR HELICOPTERS
Filed April 3, 1951 — 3 Sheets-Sheet 3
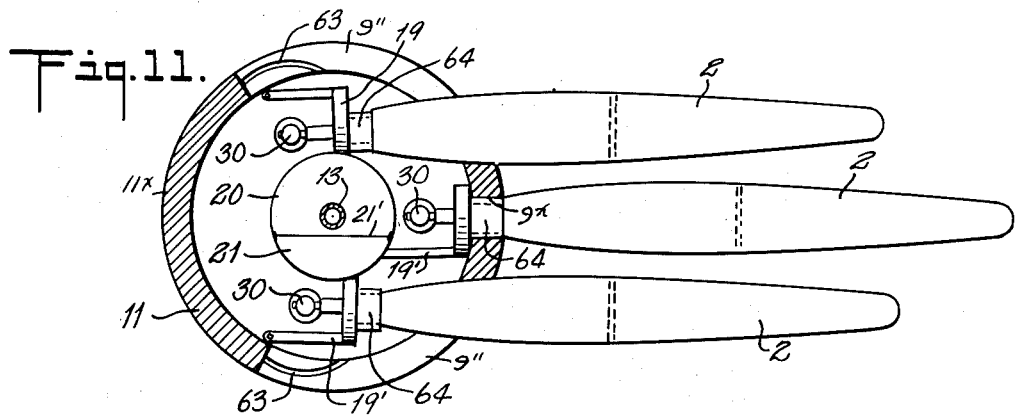
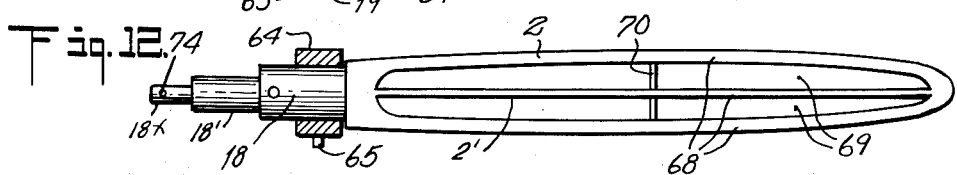
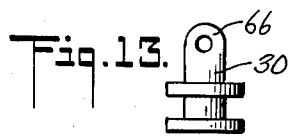
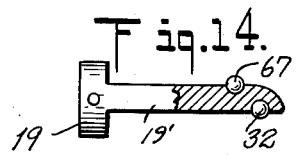
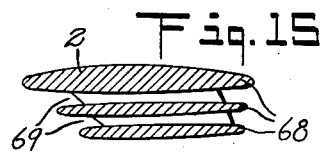
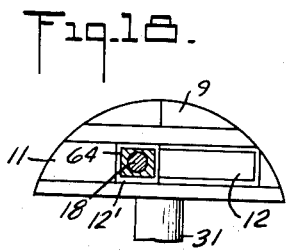
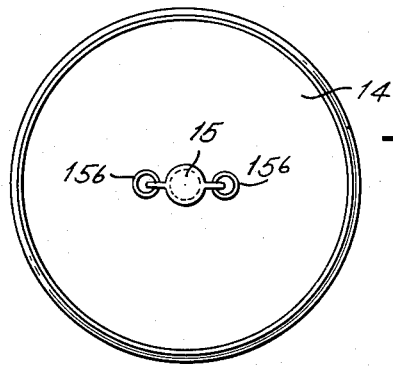
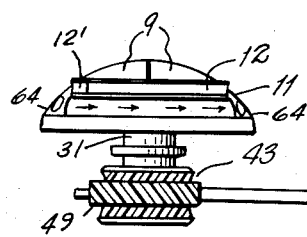
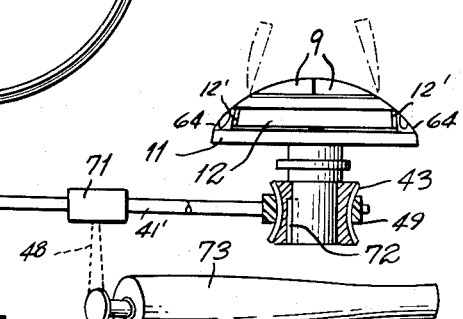
INVENTOR.
Stefan Apostolescu

United States Patent Office 2,749,994
Patented June 12, 1956

2,749,994

LIFT ROTOR CONSTRUCTION FOR TANDEM ROTOR HELICOPTERS

Stefan Apostolescu, New York, N. Y.

Application April 3, 1951, Serial No. 219,035

4 Claims. (Cl. 170—135.2)

This invention relates to helicopters and more particularly to the type having rotors at each end such as disclosed in my Letters Patent 2,384,445 and 2,549,407.

The invention contemplates a helicopter that is adapted to travel in the air and is readily convertible for traveling on land and on water.

A primary object of the present invention is to provide a helicopter with simple and compact rotor constructions that provide improved lifting power and flying speed, maneuverability and stability.

Another object of the invention is to provide improved means for mounting the rotor blades for controlling the angle of pitch or the angle of incidence of the blades, for preventing vibration of the blades and for retracting such blades when not in use.

Another object is to provide improved means for driving the rotors.

Other objects and advantages of the invention will be apparent from the description thereof to follow taken in connection with the accompanying drawings in which—

Fig. 1 is a side elevational view of a helicopter embodying my invention, showing the parachutes in operative position for an emergency landing.

Fig. 2 is a top plan view of the helicopter of Fig. 1 with the parts in normal position.

Fig. 3 is a front end view thereof.

Fig. 11 is a horizontal sectional view through the center of one of the rotor drums but showing the rotor blades in retracted position.

Fig. 12 is a side elevational view of a rotor blade.

Fig. 13 is a side elevational view of an anchor for the rotor blade.

Fig. 14 is a part elevational and part sectional view of an extension arm member for the rotor blade.

Fig. 15 is a sectional view taken on the plane of the line 15—15 of Fig. 12.

Fig. 16 is a top plan view of the plate for supporting the parachutes.

Fig. 17 is a diagrammatic view showing the drive mechanism for the rotor units, parts being shown in section and parts being omitted.

Fig. 18 is a side elevational view of the drum.

Figure 4:
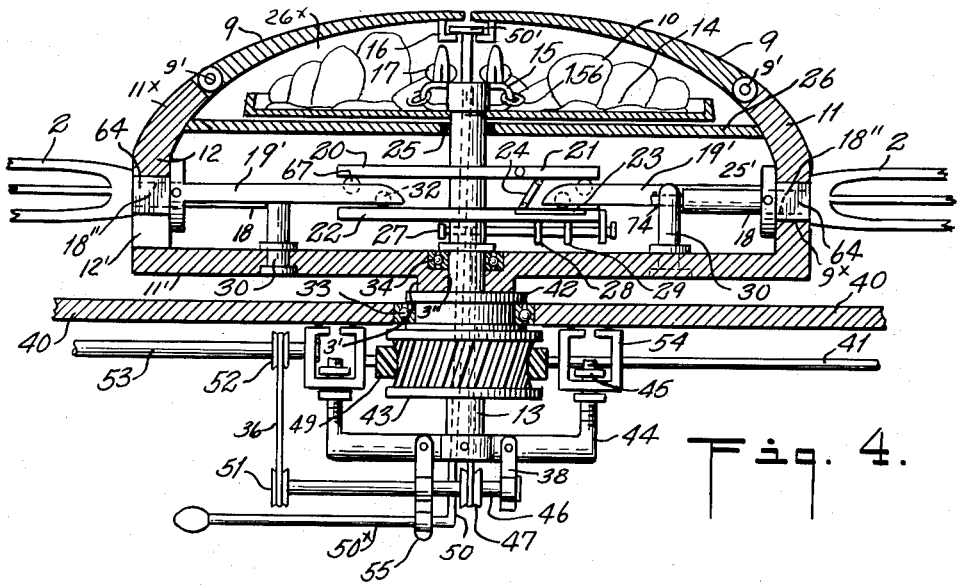
Fig. 4 is an enlarged sectional view taken substantially on the plane of the line 4—4 of Fig. 2.

Referring to the drawings in detail and particularly to Fig. 1, my improved helicopter comprises a fuselage body 3 provided with landing gear wheels 4 at its sides and with conventional airfoils 5 for steering and turbojet tubes 6 at its rear. The wheels are retractible and positioned in compartments 7 in the lower part of the body. An air inlet 8 provides air for the tubes 6. The fuselage body is stream lined and may be of any design suitable for travel in the air, on land and on water.

The helicopter is driven by rotor units positioned at the front and at the rear of the body and at the same level. Each rotor construction comprises a hollow drum 11 provided with a central hub portion 3' having an opening 3'' therethrough, said hub portion being fastened to a rotatable flanged tubular member 42 secured in an opening in the top wall 40 of the fuselage body 3. The drum has a bottom wall 11' and a side wall 11x curved inwardly at its top. The top of the drum is open but may be closed by a dome-shaped cover consisting of two cover sections 9, 9 hinged to the top of the side wall as indicated at 9', 9'. The side wall of the drum is formed with a radially disposed opening 9x and with elongated arcuate-shaped slotted or cutaway portions 9'' extending around the sides of the drum. Each slotted portion is normally substantially closed by a hinged door 12 which opens upwardly as shown in Figs. 1 and 17. The doors are suitably fastened to the wall of the drum. A partition wall 26 extends across the interior of the drum adjacent its top and with the walls of the drum forms a compartment 26' therebelow, and a shallow compartment 26x thereabove.

A plurality of rotor blades 2 are radially supported by each drum in circumferentially spaced relation as shown in Fig. 2. Each blade consists of an elongated hollow paddle shaped body open at its sides with a solid cylindrical shank portion 18 at one end. The hollow body has a central partition 2' forming the body with three planes or airfoils 68, 68, 68 with air passages 69, 69 therebetween as shown in Fig. 12. The airfoils are held spaced apart midway their ends by braces 70, 70. The shank portion is formed with a cylindrical extension 18' which is smaller in diameter than the diameter of the shank portion, and the extension 18' terminates in an extension 18x which is smaller in diameter than the diameter of the extension 18'. A bushing 64 is loosely mounted on the shank portion to permit the shank portion to rotate therein, and the bushing is held in a space 12' between the end of the door and the adjacent end of the solid portion of the wall of the drum.

On the shank portion 18 of each blade is mounted a bearing extension member comprising a collar 19 and an arm 19' extending integrally from a point on the outer periphery thereof. The outer end of the arm 19' is curved and formed with grooves in the upper and lower faces thereof as viewed in Fig. 14. A ball bearing 67 is seated in the upper groove and a ball bearing 32 is in the lower groove. The bearing member is fastened to the shank portion by means of a pin 18'' passing through aligned openings in the shank portion and collar 19.

Each blade is adapted to be moved to operative position or to retracted position such as shown in Fig. 11 by opening the door 12 and manually swinging the blade in an arcuate direction, such movement being guided by a pin 65 depending from the bushing 64 engaging in a curved guiding slot 63 formed in the surface of the cutaway portion 9''.

A vertical tube 13 extends upwardly through the tubular member 42 in the top wall 40 of the fuselage body, and upwardly through central openings in the bottom wall 11' of the drum and in the partition 26 to a point just beyond said partition. The tube is supported in upright fixed position by L-shaped arm members 44 adjustably supported by U-shaped brackets 54 fastened to the underside of the top wall 40 of the fuselage body. The top of the vertical portion of each arm member 44 as viewed in Fig. 4 is screw threaded and coacts with an internally screw threaded flanged bushing member 45 that passes through an opening in the bracket 54. The outer end of each horizontal portion of the arm is shaped and threaded to engage and coact with the threads 13' on the bottom end of the tube 13.

Figures 8, 9, 10:
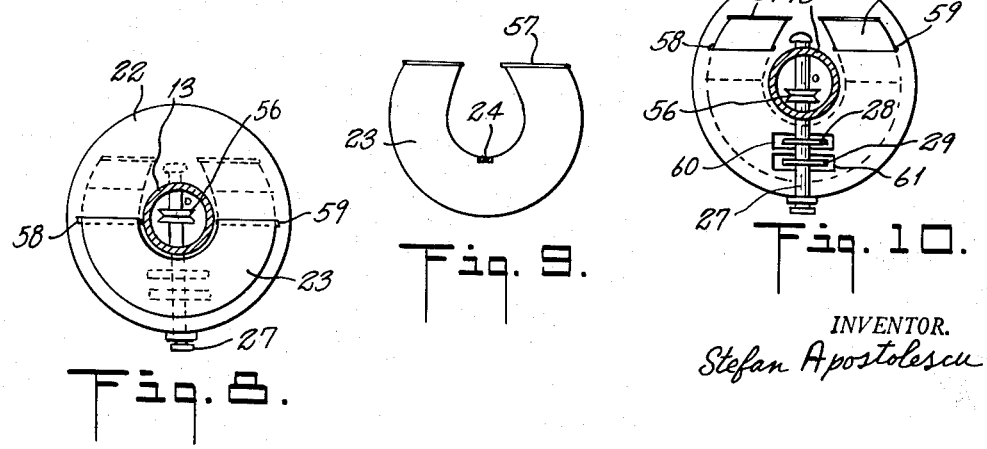
Fig. 8 is a view looking down on one of the cam supporting disc members and showing the cam member and associated parts.
Fig. 9 is a top plane view of the camming plate member.
Fig. 10 is a view similar to Fig. 8 but looking inwardly on the bottom of the cam supporting disc member.

Fastened on the tube 13 in the drum compartment 26' is an upper disc member 20 having a section 21 along the periphery thereof which is hingedly connected to the rest of the disc member as indicated at 21'. Another disc member 22 is fastened to the tube below and spaced from the disc member 20. Disc member 22 is provided on its upper surface as viewed in Fig. 4 with an arcuate-shaped depression and loosely mounted in this depression is a semicircular track-like camming plate member 23. The ends of the plate member 23 extend through opposed slots 58 and 59 in the disc member 22 and project to and along the under surface of said disc member 22 as shown in Fig. 10 where it is hingedly connected to the disc member 22 as indicated at 57 so that it is capable of being hingedly moved up and down.

Rotatably secured in the bottom wall 11' of the drum at spaced point circumferentially therearound and extending above said wall are three upright standards or anchors 30, the upper end of each being perforated as indicated at 66. These anchors are positioned in alignment with the slotted portions 9" and the opening 9x of the side wall of the drum.

One of the rotor blades 2 is mounted in the opening 9x with its bushing 64 positioned in the opening and its shank portion 18 extending inwardly into the compartment 26' inside the drum. The inner terminal end 18x of the shank portion extends through the perforation 66 in the anchor 30 which is in line with said opening and is fastened to said anchor by a pin 74 passing through an opening in the protruding portion of said terminal end. The arm portion 19' of the extension member of the shank portion extends along the shank portion and projects inwardly beyond the end of the shank portion and its inner free end is positioned between the upper and lower disc members 20 and 22, respectively, with its ball bearings 67 and 32 in engagement with the opposed surfaces of said disc members to facilitate movement thereof.

The other two rotor blades 2 extend through the spaces 12' between the ends of the wall of the drum and the adjacent ends of the doors, when the doors are closed. The bushings 64 fit snugly in said spaces, being held against displacement by the ends of the doors. The terminal ends 18x of the shank portions of the blades are fastened to the anchors 30 positioned adjacent to and in a line with said spaces 12. The inner free ends of the extension arm members 19' of the blades are positioned between the upper and lower disc members 20 and 22, respectively, in the same manner as the blade 2 in the opening 9x. The three rotor blades 2 are thus tied to the drum and carried around with it. The arm members 19' of the blades with their ball bearings carried thereby will roll over the flat face of the camming plate member 23 and the blades 2 will maintain a fixed angle of incidence of the blade. This position is used only during the raising of the helicopter or when it is kept in the air in a stationary position.

In order to retract the latter two blades, the doors 12 are opened and the blade units including their bushings 64 are bodily moved through and along the arcuate spaces 12' to positions in parallel relation with the fixed blade 2 as shown in Fig. 11.

The front and rear rotors 11 are driven in opposite directions. The drive mechanism for the rotors includes an annular screw gear 43 fastened to the bottom of the tubular member 42 of each drum inside the fuselage body around the tube 13. A jet motor shown diagrammatically at 73 in Fig. 17 is connected to gearing in a box 71 by a flexible connection 48. Extending from opposite ends of the box and operatively connected to the gearing therein are pairs of parallel driven shafts 41, 41. Screw members 49, 49 are fastened to the free ends of the shafts 41, 41, a pair of said screw members being positioned on opposite sides of and in meshing engagement with the teeth of each screw gear 43 so that the drums are rotated in opposite directions. Ball bearings are interposed between each tube 13 and its tubular member 42, wall 11' and partition 26 as indicated at 33, 34 and 25, respectively, in order to facilitate rotation of the drum.

An important feature of the present invention is the improved means for changing the angle of pitch or the angle of incidence of the rotor blades 2. For this purpose, the inner free ends of the arm portions 19' of the bearing extension members are positioned between the disc members 20 and 22 and in alignment with the cam section 21 and camming plate member 23, respectively, of said disc members so that when the drums are rotated, the free ends of the arm portions 19' with the ball bearings carried thereby will roll over the flat face of the camming plate members 23. When it is desired to change the angle of incidence or pitch of the blades, the camming plate member 23 is actuated. The mechanism for actuating the camming plate member includes a shaft 27 extending through aligned openings in the tube 13. Shaft 27 extends across and under the disc member 22 and through a bearing lug 39 depending from the periphery of said disc member. The shaft extends in close proximity to and across a pair of closely spaced slots 60 and 61 formed in the disc member. Fastened to the shaft 27 at points in alignment with the slots 60 and 61 are heart shaped cams 28 and 29, respectively. Another shaft 46 is disposed parallel to shaft 27 and supported in bracket members 55 and 38 depending from the L-shaped arms 44. A belt 37 brings the drive from a pulley 47 on shaft 46 to a pulley 56 on shaft 27. The outer end of shaft 46 mounts a pulley 51 driven by a belt 36 and pulley 52 on a drive shaft 53 which is operatively connected to a motor or the like (not shown).

Figures 5, 6, 7:
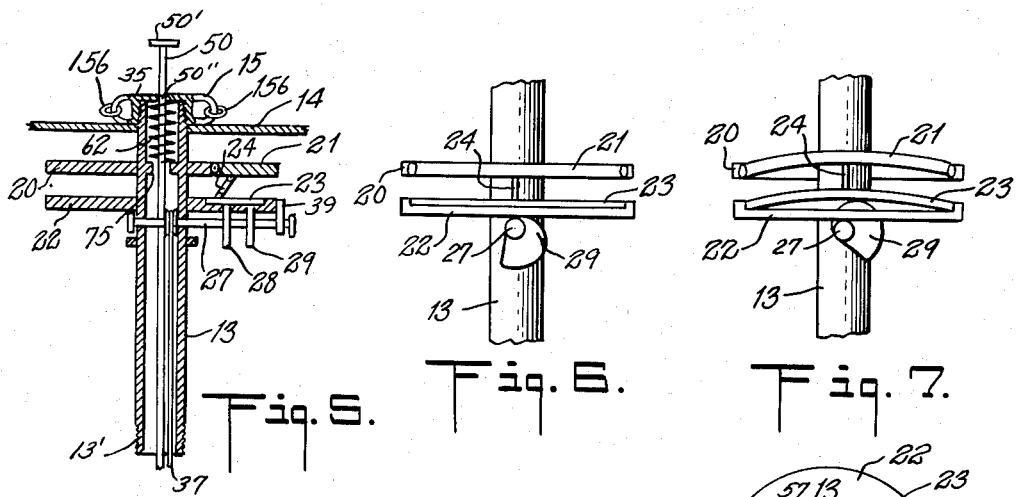
Fig. 5 is a fragmentary sectional view showing the cam members and actuating means therefor, parts being omitted.
Fig. 6 is a fragmentary side elevational view showing the cam members and actuating means therefor in inoperative position.
Fig. 7 is a view similar to Fig. 6 but showing the parts in operative position.

When shaft 27 is rotated, it swings the cams 28 and 29 upwardly through the slots 60 and 61, respectively, against the under surface of the camming plate member 23 of disc member 22 thereby lifting said camming plate member 23 as shown in Fig. 7. The movement of the camming plate 23 is imparted to the cam section 21 of disc member 20 by means of the connecting rod 24 so that cam section 21 moves upwardly also as shown in Fig. 7. When the extension arm members 19' of the blades roll over the raised camming plate member 23, said arm members will be twisted and tilted thereby twisting and tilting the outermost extremities of the blades 2 and thereby changing the angle of the pitch or the angle of incidence of each blade.

The rotor blades 2 may also be twisted and tilted manually for changing the angle of pitch or the angle of incidence. This is accomplished by raising or lowering the tube 13. The tube is moved vertically by manually rotating the bushing members 45 whereby the screw-threaded L-shaped arms 44 are raised or lowered. When the tube is thus moved upwardly or downwardly, the disc members 20 and 21 are correspondingly moved. The extending arm members 19' of the blades will follow the disc members and the outer extremities of the blades will be reversely moved, upward or downward, as desired. During flight, the air pressure upon the blades and the pressure of the upper cam disc over the blade arm members 19' will maintain said arm members against the lower camming plate member 23.

I also provide apparatus for safely bringing the helicopter to earth in case of an emergency. For this purpose, a flanged plate 14 is secured to the tube 13 of each rotor unit adjacent its upper end, at the bottom of the compartment 26x. This plate is adapted to support in folded and collapsed condition one or more parachutes 10. A cap member 35 is threaded on the top end of the tube for closing said end and this cap member is provided with a number of perforated ear members 15 to which the cords 10' of the parachutes 10 are anchored by means of rings 156. A stem 50 extends loosely through the tube 13 and cap 35 and projects thereabove. The top end of the shaft terminates in a key 50' which coacts with L-shaped lugs 16 on the adjacent meeting edges of the cover sections 9 for holding the cover closed. The stem is formed with an integral handle 50x at its bottom end for manipulating the same. The handle is removably held by the bracket 55. When the shaft is turned by the handle, the key 50' is moved out of engagement with the lugs on the cover sections permitting said cover sections to open as shown in Fig. 9. The cover sections may be opened by forcing the stem 50 upwardly against the meeting edges of the cover sections, by an expansion spring 62 which surrounds the stem inside the tube 13 and has one end seated on an annular flange 75 inside the tube and its other end impinged against a fixed portion of the shaft as indicated at 50".

When the cover sections are opened, the parachutes may be released and forcibly ejected to the position shown in Fig. 1. Rockets 17 are shown in the compartment 26' of the drum for this purpose. These rockets are operatively connected to the parachutes and are set off in any well known manner.

It will be noted that the parachute supporting plate 14 is stationary so that when the rotor unit is rotated, the parachutes in compartment 26' in folded condition are not disturbed and are in proper condition for release when desired.

The operation of the helicopter is as follows: the shaft 27 of each rotor unit may be rotated by means of the drive shaft 53 and connections to cause the cams 28 and 29 to raise or lower the camming plate member 23. This controls the pitch or the incidence of the rotor blades 2. During rotation of the drum 11 the ball bearings 32 of the arm members 19' of the blades will move upwardly and downwardly following the cam track member 23 and the pitch of the blade will be varied by this arrangement. The blades may be operated to drive forward or rearward or upward or downward as desired.

The bushings 45 may be turned in one direction or the other so as to indirectly raise or lower the tube 13 of one of the helicopter rotors. Raising and lowering the tube causes raising and lowering of the disc members 20 and 22. This will cause tilting and twisting of the arm members 19' and the outer extremities of the blades and thus vary the angle of incidence of the helicopter blades 2 as schematically shown in Fig. 3.

The engine 73 drives the shafts 41 through the gears in box 71 and the shafts 41 in turn drive the drums in opposite directions and the blades 2 being tied to the drums rotate therewith.

While I have illustrated and described the preferred embodiment of my invention, it is to be understood that I do not limit myself to the precise construction herein disclosed and the right is reserved to make all changes and modifications coming within the scope of the invention as defined in the appended claims.

Having thus described my invention, what I claim as new, and desire to secure by United States Letters Patent is:

1. A helicopter rotor construction comprising a non-rotatable slidable tube extending vertically from the helicopter body, a hollow drum rotatably mounted on the helicopter body about said tube, said drum having a bottom wall and a slotted side wall, anchor members extending upwardly from the bottom wall of the drum and rotatable thereon, a plurality of rotor blades pivotally and tiltably extending through the slots in the side wall of the drum and having their inner ends pivotally mounted on the anchor members thereby forming turning points about which the rotor blades can be turned on their longitudinal axes for varying their pitch angle, upper and lower disc members fixed on the tube within the hollow drum, an arm member extending from the inner end of each of the blades into the space between the disc members, in the path of vertical movement of said disc members, and means for sliding said tube vertically for varying the pitch of the rotor blades, said means including a pair of opposed L-shaped arms depending from the helicopter body, the ends of the vertical portions of the L-shaped arms being screw threaded and the ends of the horizontal portions being fastened to the lower end of the tube, and manually actuated threaded bushings rotatably and operatively connected to the threaded upper ends of the L-shaped arms whereby upon rotation of the bushings the L-shaped arms move vertically carrying the tube and disc members along with them.

2. In a helicopter having an elongated fuselage body, a rotor unit rotatably mounted on the body, at each end thereof, each rotor unit including a hollow drum having a bottom wall and a side wall, said side wall having a radially disposed opening and having an elongated arcuate shaped slotted portion on each side spaced from the radial opening, the bottom surface of each of said slotted portions having a curved groove formed therein, upright standards rotatably secured to the bottom wall of each drum and disposed circumferentially around its bottom wall opposite the opening and slotted portions, a rotor blade mounted in and extending through the radial opening of each drum and having its inner end secured to one of said standards, a rotor blade extending through the slotted portion of each side wall and having its inner end secured to one of said standards, each of said latter blades being normally disposed at an angle to said first mentioned blade and carrying a pin at its inner end adapted to ride in the groove in the bottom surface of the slotted portion through which the blade extends whereby the blade may be manually swung laterally on its standard and guided to retracted position alongside and parallel to said first mentioned blade.

3. A helicopter rotor construction comprising a body, a non-rotatable tube extending from the helicopter body, a hollow drum rotatably mounted on the helicopter body about said tube, said drum having a bottom wall and a slotted side wall, upstanding anchor members rotatably mounted on the bottom wall, a plurality of rotor blades pivotally extending through the slots in the side wall of the drum and having their inner ends pivotally mounted on the anchor members thereby forming turning points about which the rotor blades can be turned on their longitudinal axes for varying their pitch angle, a lower disc member mounted on the tube within the drum, an upper disc member mounted on the tube within the drum, an arm member extending from the inner end of each of the blades between said disc members, a semi-annular camming plate member pivotally mounted on the top face of the lower disc member in the path of movement of the blade arm members, means on the upper disc for controlling the pivotal movement of said camming plate, and means for moving said camming plate during rotation of the drum and rotor blades to vary the pitch of the rotor blades including a rotatable shaft, cams carried by said rotatable shaft adapted to engage and move the camming plate member upon rotation of said shaft, an operative drive shaft and flexible means of connection between the drive shaft and the rotatable shaft for rotating the latter shaft.

4. In a helicopter, the combination with a propeller mounted for rotation about a vertical axis and having a plurality of blades pivotally mounted for pitch adjustment, extensions on said blades, means for changing the pitch of the blades while the propeller operates comprising an upper disc member encircling the axis of rotation of the propeller and having a peripheral hinged section, a lower disc member encircling the axis of rotation of the propeller in spaced relation to the upper disc member and having slots in opposed sides thereof and having slots in alignment with said hinged section, a semi-annular camming plate carried by the lower disc member with its ends slidably extending through the side slots thereof, said camming plate being disposed in the path of movement of the extensions of said blades, a rod connecting said peripheral hinged section and said camming plate, a rotatable shaft disposed adjacent said camming plate, cams on said shaft extending through the aligned slots in the lower disc member and engaging said camming plate, and means for rotating said shaft.

References Cited in the file of this patent

UNITED STATES PATENTS

| Number | Name | Date |
|---|---|---|
| 1,009,770 | McKenzie | Nov. 28, 1911 |
| 1,023,233 | Williams | Apr. 16, 1912 |
| 1,076,803 | Williams | Oct. 28, 1913 |
| 1,237,318 | Flink | Aug. 21, 1917 |
| 1,705,489 | Mladinich | Mar. 19, 1929 |
| 1,792,758 | Piampiano | Feb. 17, 1931 |
| 1,957,277 | Leray | May 1, 1934 |
| 2,333,555 | Prucha | Nov. 2, 1943 |
| 2,348,249 | Ferro | May 9, 1944 |
| 2,372,481 | Gagas | Mar. 27, 1945 |
| 2,384,445 | Apostolescu | Sept. 11, 1945 |
| 2,385,464 | Peterson | Sept. 25, 1945 |
| 2,389,798 | Main | Nov. 27, 1945 |
| 2,410,239 | Roe | Oct. 29, 1946 |
| 2,529,479 | Bates | Nov. 14, 1950 |
| 2,655,997 | Peterson | Oct. 20, 1953 |